Dec. 13, 1938.　　　　J. C. YOKUM　　　　2,139,710
RESTRAINING DEVICE
Filed Nov. 19, 1936　　　7 Sheets-Sheet 2

Inventor
John C. Yokum
By Clarence A. O'Brien
Hyman Berman
Attorneys

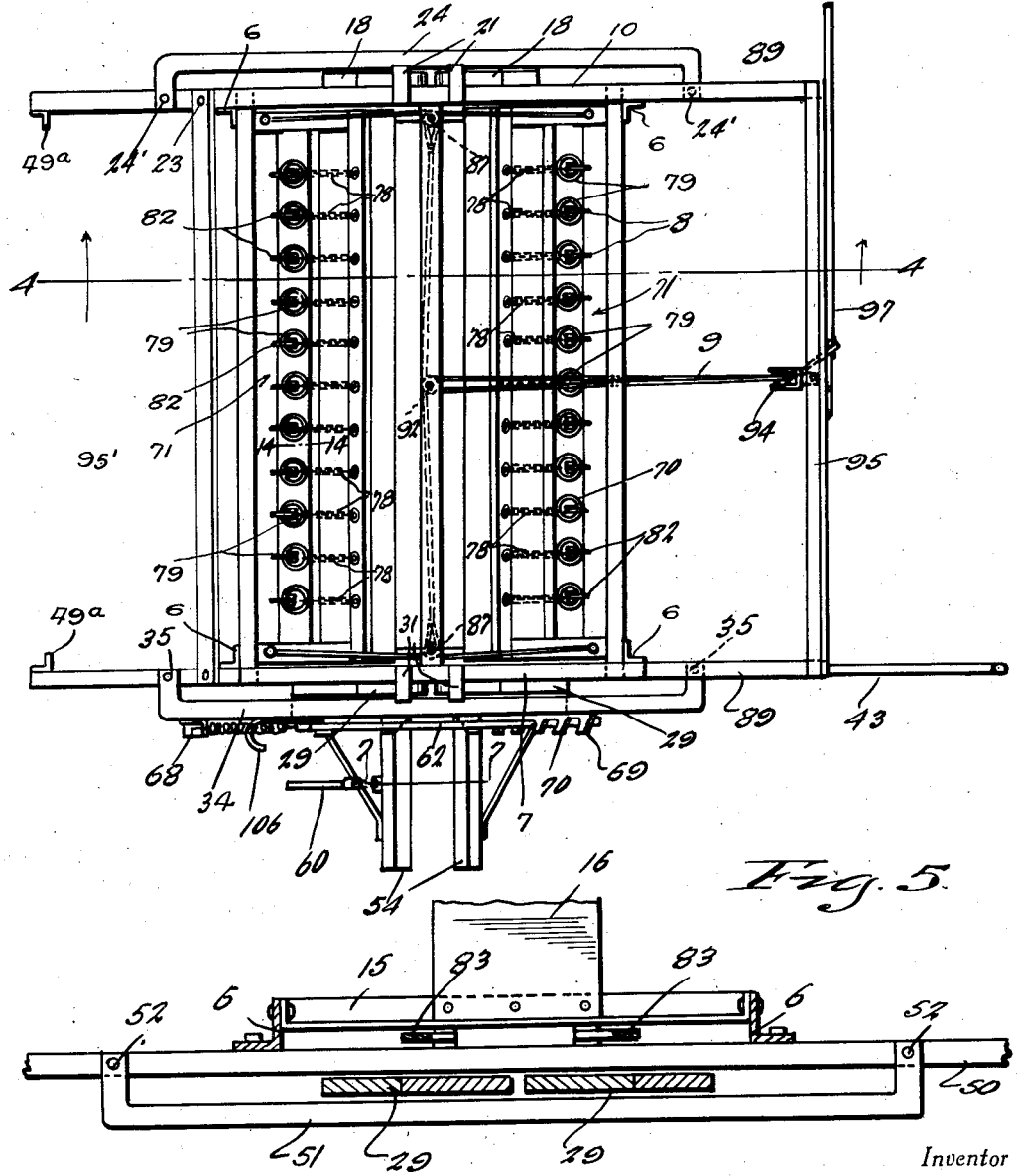

Dec. 13, 1938.  J. C. YOKUM  2,139,710
RESTRAINING DEVICE
Filed Nov. 19, 1936   7 Sheets-Sheet 4
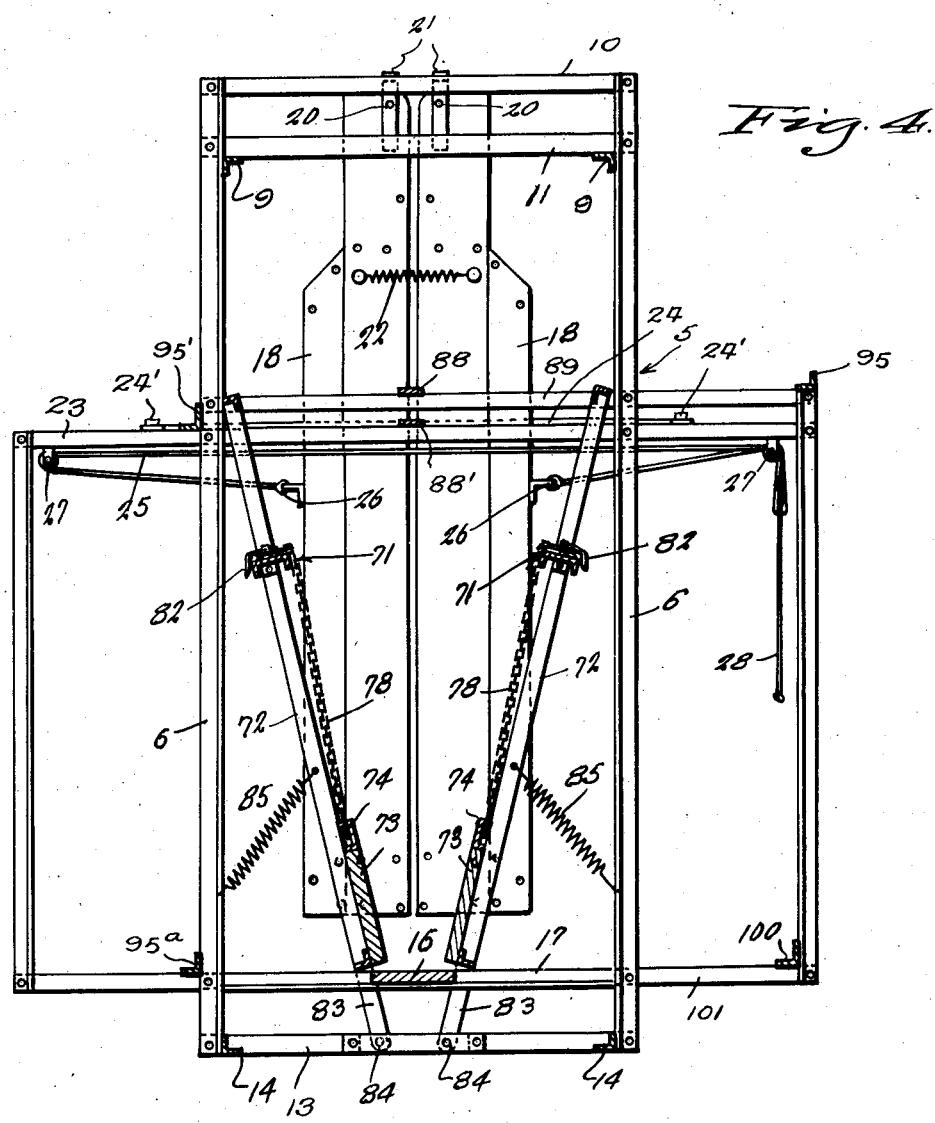
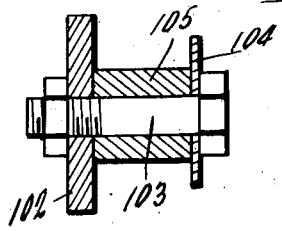
Inventor
John C. Yokum
By Clarence A. O'Brien
Hyman Berman
Attorneys

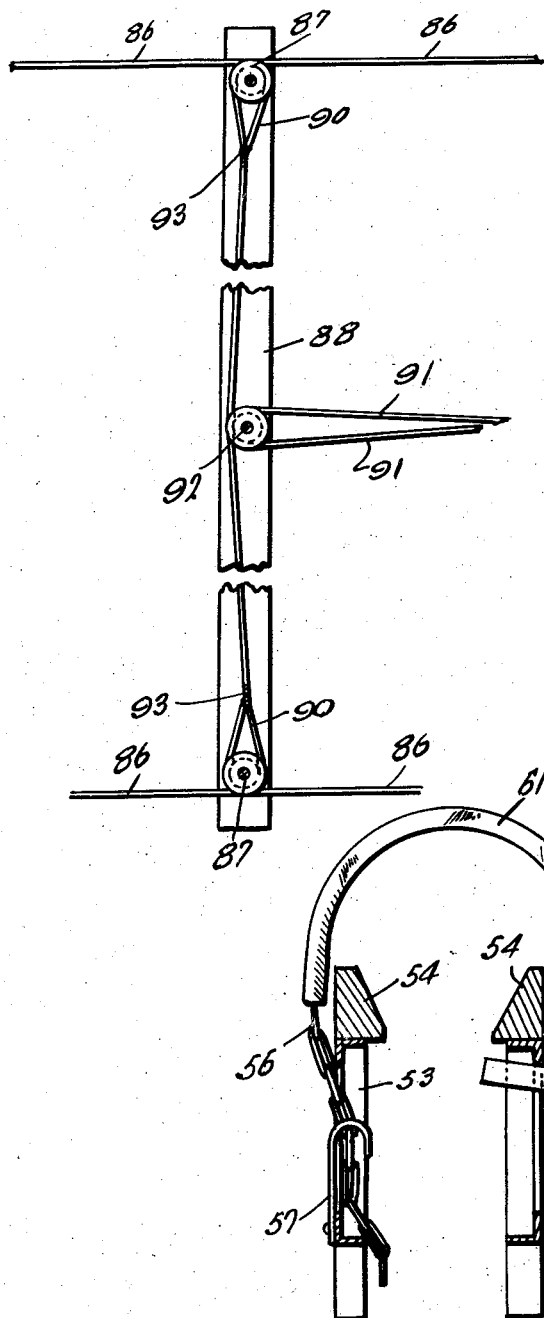
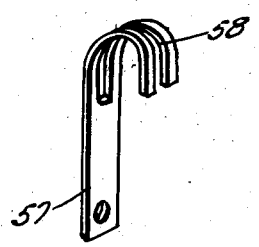
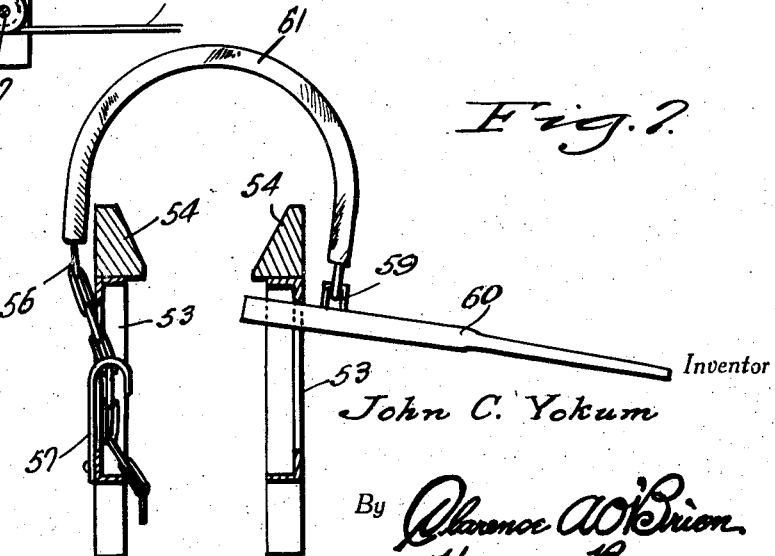

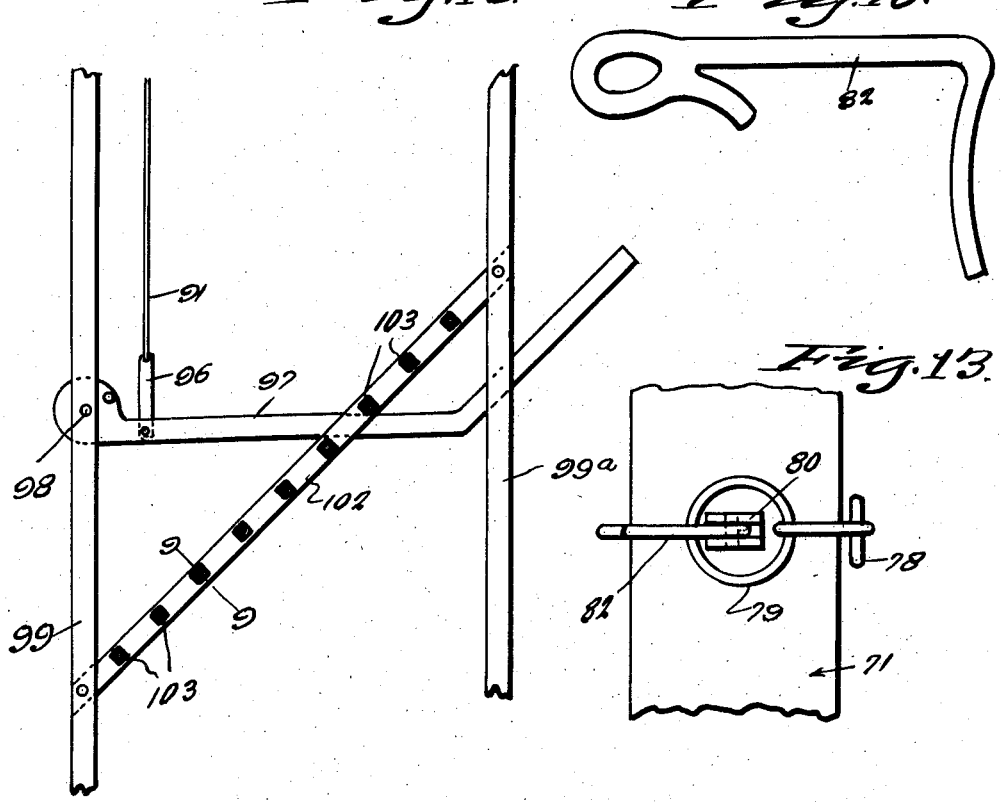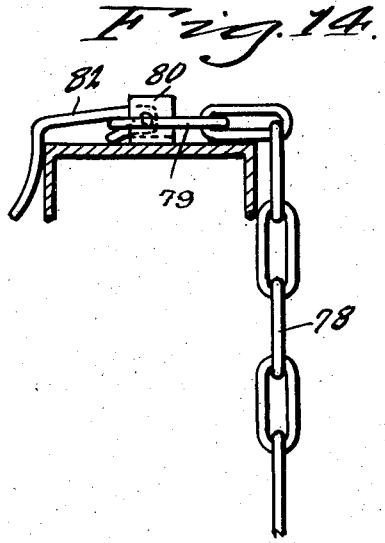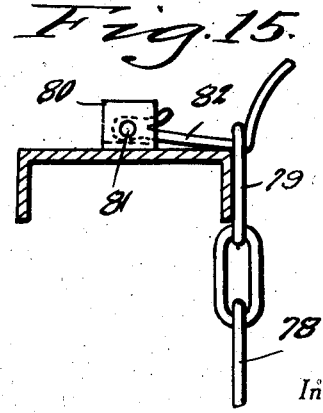

Dec. 13, 1938.  J. C. YOKUM  2,139,710
RESTRAINING DEVICE
Filed Nov. 19, 1936   7 Sheets-Sheet 7

Inventor
John C. Yokum
By Clarence A. O'Brien
Hyman Berman
Attorneys

Patented Dec. 13, 1938

2,139,710

UNITED STATES PATENT OFFICE 2,139,710

RESTRAINING DEVICE

John C. Yokum, Oakland, Calif.

Application November 19, 1936, Serial No. 111,734

6 Claims. (Cl. 119—98)

This invention is a device for so securing or restraining livestock as to facilitate branding, dehorning and other operations pertaining to the handling of livestock.

The invention comprehends the provision of a combined head stanchions and body squeeze as will render an animal helpless to the end that the desired operation may be performed on the animal.

The invention together with its objects and advantages will be best understood from a study of the following description taken in connection with the accompanying drawings wherein:—

Figure 3 is a top plan view of the device.

Figure 4 is a detail sectional view taken substantially on the lines 4—4 of Figure 3.

Figure 5 is a horizontal sectional view taken substantially on the line 5—5 of Figure 1.

Figure 6 is a fragmentary top plan view showing a cable and pulley assembly for use in drawing the body "squeeze" members into contact with the body of the animal.

Figure 7 is a detail sectional view taken substantially on the line 7—7 of Figure 3.

Figure 8 is a perspective view of a hook member.

Figure 9 is a detail sectional view taken substantially on the line 9—9 of Figure 10.

Figure 10 is a fragmentary side view illustrating certain details hereinafter more fully referred to.

Figure 13 is a fragmentary top plan view showing the manner of releasably securing the chains of a body "squeeze" member to the top edge of said member.

Figure 14 is a detail sectional view taken substantially on the line 14—14 of Figure 3.

Figure 15 is a view similar to Figure 14 but showing the hook and chain in a released position.

Figure 16 is a side elevational view of a hook forming part of the invention.

Figure 1:
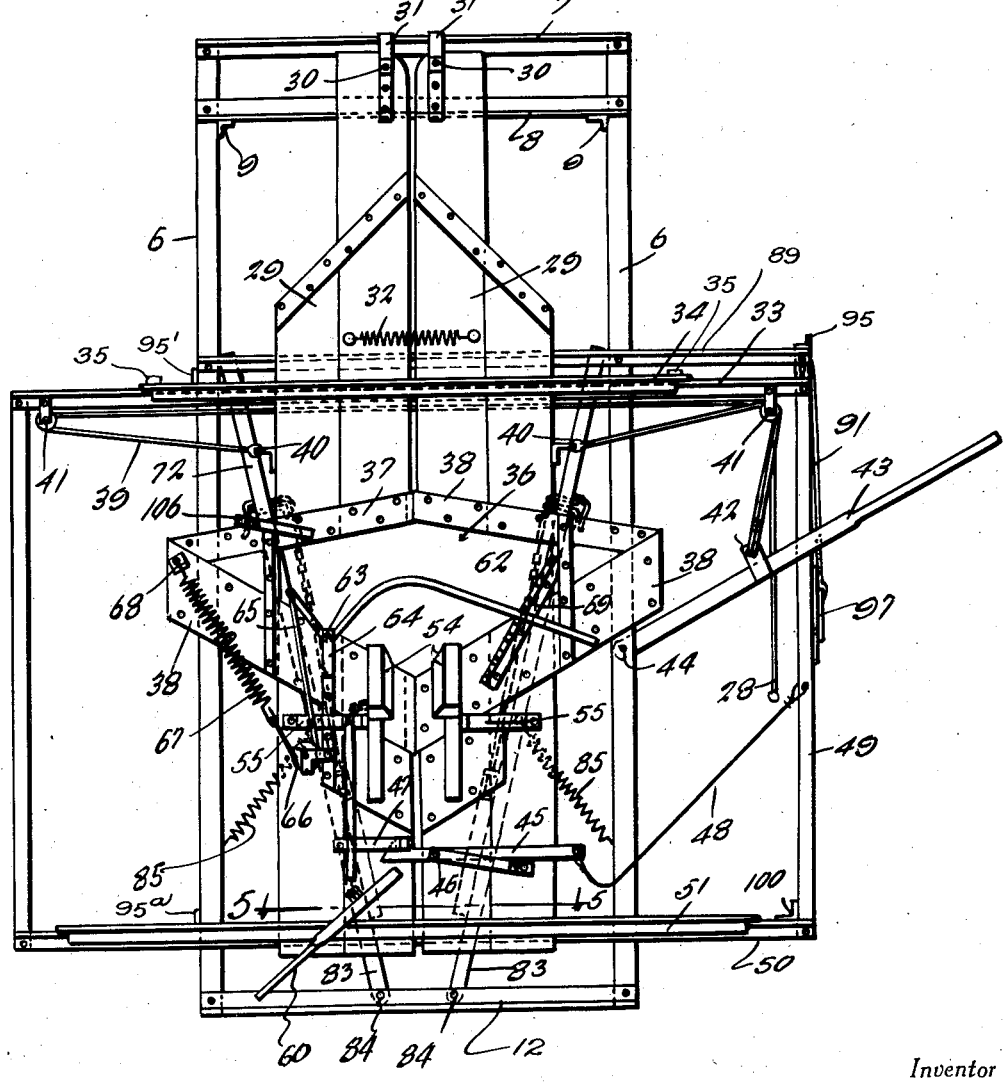
Figure 1 is a front elevational view of the device.

Referring to the drawings by reference numerals it will be seen that in the preferred embodiment thereof the restraining device comprises a skeleton frame structure 5 which may be of any suitable construction. However, in the present instance the frame structure 5 is shown as consisting of four uprights 6 arranged in the form of a rectangle and connected at their upper and lower ends by horizontal bars 7, 8, 9, 10, 11, 12, 13 and 14—14.

Mounted between the front posts 6 as shown in Figure 5, is an angle bar 15 to which is secured a relatively narrow floor board 16. At the rear of the device the floor board 16 is also secured to a crossbar 17 supported between the lower ends of the rear standards 6. Preferably the floor board 16 is of a width to just barely accommodate the feet of the animal.

Entrance into the restraining device is through the rear of the device. At the rear of the device there are provided a pair of complemental door or closure members 18.

Figure 2:
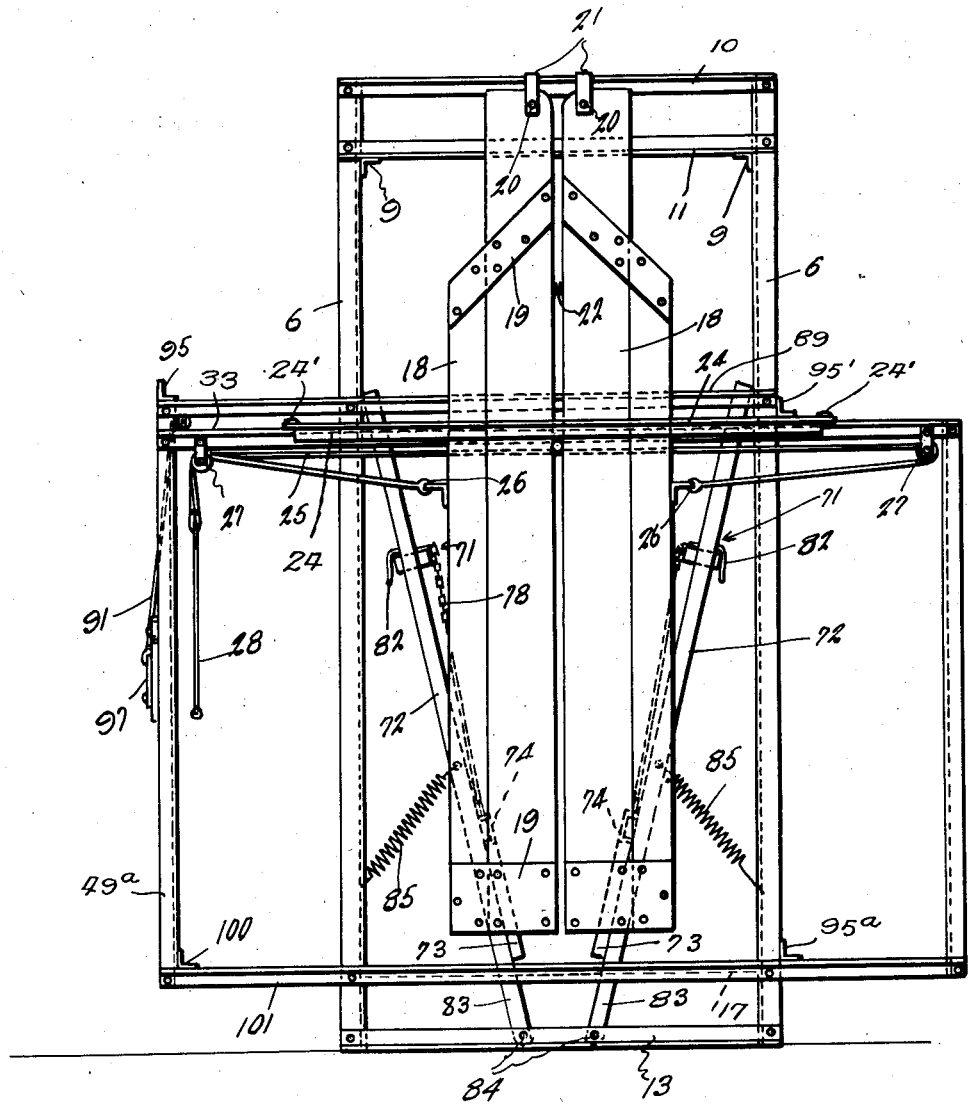
Figure 2 is a rear elevational view thereof.

As shown in Figure 2 the door or closure members 18 consist of strips of wood of suitable width secured together through the medium of reinforcing plates 19 riveted or otherwise secured to the wood strips as clearly shown.

At the upper end thereof the door or closure members 18 are pivoted as at 20 to brackets 21 that depend from the frame member 10.

The door members 18 are normally urged into substantial parallelism with one another, which is a substantially closed position, through the medium of a coil spring 22 suitably anchored at its respective opposite ends to the door members as best shown in Figure 4.

The door members 18 swing in vertical planes between a horizontal bar 23 secured to the rear uprights 6 and a guide bar 24 having inturned ends riveted or otherwise secured to the bar 23 as at 24'. (See Figure 3.)

Operating means for the doors 18 consist of a cable 25 which has its respective opposite ends secured to the doors 18 as at 26 and trained over pulleys 27 mounted in suspension brackets depending from the bar 23. Secured to an intermediate portion of the cable 25 is a pull string or the like 28.

From the above it will be seen that when a pull is exerted on the member 28 doors 18 against the action of spring 22 will swing vertically about their pivots 20 away from one another to permit an animal to pass therebetween and into the restraining device, the animal stepping on to the floor board 16. Upon release of the pull on the member 28 spring 22 will act to return the door members 18 to a closed position behind the animal.

At the front thereof the restraining device is provided with a pair of complemental narrow doors 29 which are mounted to swing vertically relative to one another, the doors being pivoted at their upper ends as at 30 to brackets 31 that depend from a front cross member 7 as shown in Figure 1.

The doors 29 are also urged inwardly towards one another and into closing position through the medium of a spring 32 the opposite ends of which are suitably anchored to the doors 29.

Doors 29 swing vertically between a front cross bar 33 that is secured to the front uprights 6 and a guide bar 34 the opposite ends of which are turned inwardly and riveted or otherwise secured to the bar 33 as at 35 and as clearly shown in Figure 3.

Intermediate their respective upper and lower ends the doors 29 are notched or otherwise complementarily formed to provide a head receiving opening or aperture 36 bordered by metallic reinforcing plates 37, 38.

An operating means for the doors 29 consists of a cable 39 the relatively opposite ends of which are secured to the doors 29 as at 40, and are also trained over suitably mounted pulleys 41 mounted on brackets depending from the bar 33. The looped end or intermediate portion of the cable 39 is trained through an apertured cleat or lug 42 provided intermediate the ends of a hand lever 43 which is pivoted at one end as at 44 to one of the front posts 6 as shown in Figure 1.

Thus it will be seen that as the animal enters the device through the rear thereof the operator by pressing downwardly on the lever 43 will cause the doors 29 to swing apart so as to permit the head of the animal to extend outwardly between the doors 29 so that the neck of the animal will be received within the opening 36 as the doors 29 return to a closed position. Thus it will be seen that the doors 29 as constructed serve as a head stanchion for restraining the animal.

For releasably securing the doors 29 in the closed position or position shown in Figure 1 there is provided a latch member 45 pivoted to a lower portion of one of the doors 29 as at 46 and engageable with a fixed keeper 47 mounted on the lower portion of the other door 29. The latch member 45 is so pivoted as to normally swing in a clockwise direction to engage the head thereof with the keeper 47. To facilitate swinging the latch member 45 in a counterclockwise direction to release the head of the latch member there is provided a pull string 48 secured at one end to the free end of the latch member 45 and at an opposite end suitably secured to a vertical frame member 49 that extends between the upper aforementioned cross bar 33 and a lower cross bar 50 which latter is secured to the front standards 6 upwardly from the lower ends of the standards.

In connection with the bar 50 it will be noted that the lower ends of the doors 29 work between an intermediate portion of the bar 50 and a guide bar 51 the opposite ends of which are inturned and riveted or otherwise secured as at 52 to the bar 50 (see Figure 5).

The bars 34 and 50 will also serve to prevent the doors 29 being forced forwardly by any thrust exerted thereon by the animal.

The doors 29 below the opening 36 have projecting forwardly therefrom brackets 53 which support on their upper ends rests 54 upon which the animal places his nose or snoot. Brackets 53 are braced with respect to the doors 29 through the medium of suitable brace rods 55.

For maintaining the nose or snoot of the animal on the rests 54 there is provided a length of chain or the like 56 one end portion of which is adapted to be suitably engaged with a hook 57 mounted on one of the brackets 53. Hook 57 has the bill portion thereof bifurcated to provide a slot 58 to permit of an engagement of a portion of the chain 56 therewith in a manner as clearly suggested in Figure 7.

At its relatively opposite end chain 56 is connected as at 59 with one end of a lever 60. Also, an intermediate portion of the chain is covered by a sheathing 61 of rubber, cloth, or other suitable material. It will thus be seen that with one end of the chain suitably engaged with the hook 57 the sheathed portion of the chain is placed across the top of the nose of the animal after which one end of the lever 60 is engaged, in a manner clearly shown in Figure 7, with the bracket 53 and a downward pressure by the operator exerted on the lever 60 for placing the chain 56 under tension and thereby maintaining the nose of the animal on the rests 54.

As a further restraining means for the animal there is provided a lever 62 that adjacent one end thereof is pivoted as at 63 to a bracket 64 suitably mounted on one of the doors 29. At the pivoted end thereof, lever 62 is connected with one end of a cable 65 that is trained over a pulley 66 suitably mounted on said one door 29 and connected with a spring 67 anchored to one of the plates 38 as at 68. Thus it will be seen that the spring 67 will normally act to urge the lever 62 to swing vertically upwardly and in a counterclockwise direction.

The lever 62 is adapted to be brought down over the neck of the animal to lock the head of the animal in the opening 36. To secure the lever 62 in the animal restraining position there is provided on the other door 29 a diagonally disposed keeper bar 69 that is provided with a series of notches 70 as clearly shown in Figures 1 and 3 and with which the lever 62 is selectively engaged as is thought apparent.

For placing the body of the animal at opposite sides of the body under pressure and in a manner to restrain the animal from shifting laterally from one side to the other and off of the floor board 16 there are provided a pair of oppositely disposed body "squeeze" members 71.

Figure 11:
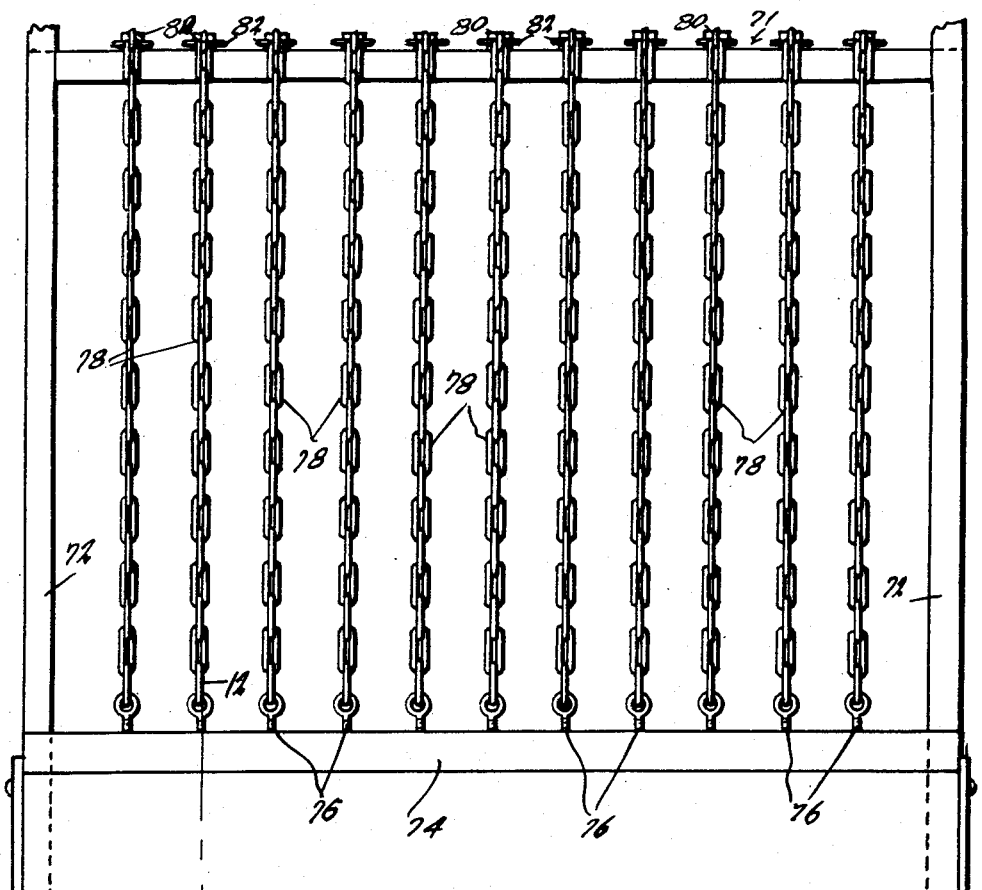
Figure 11 is an elevational view of one of the body "squeeze" members.
Figure 12:
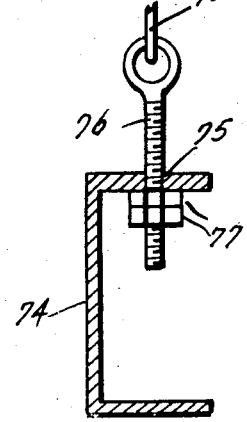
Figure 12 is a detail sectional view taken substantially on the line 12—12 of Figure 11.

Referring particularly to Figures 11 and 12 it will be seen that each of the members 71 comprises a substantially rectangular frame 72 that has disposed across the lower edge thereof a plate 73 and a channel bar 74 secured to the upper edge of the plate 73.

The top flange of the channel 74 is provided with a series of relatively spaced openings 75 which receive eye bolts 76 equipped with jam nuts 77.

The chains 78 at one end have links engaged with the eyes of the bolts 76 as shown in Figures 11 and 12 while at their upper or free ends the chains 78 are provided with rings 79.

Referring to Figures 13 to 16 inclusive, it will be seen that frame 72 above the bar 74 is provided with a bar 74a to which, for each of the chains 78, there is secured a substantially U-shaped member 80 between the sides of which is pivoted as at 81 one end of a substantially L-shaped hook 82. The hook 82 is trained through a ring 79 on the free end of the chain 78 in a manner, when the hook 82 is swung from the position shown in Figure 15 to the position shown in Figure 14 to exert an upward pull on the chain 78 for placing the latter under tension.

It will be understood that the chains 78 are provided to exert a yielding pressure against the adjacent side of the body of the animal and where it is desired to relieve the tension of one or more chains against the side of the animal the hooks 82 for those chains are swung to the position shown in Figure 15. Release of tension on one or more chains may be required when it is desired to spread the chains apart, for example, to apply a branding iron to the side of the animal or for any one of several different reasons.

Also, each of the members 71 has secured to opposite sides of the frame 72 at the lower end of the frame straps 83 the free ends of which depend beyond the lower end of the frame and are pivoted as at 84 to the bottom frame members 10 and 13.

The members 71 are yieldably urged to swing laterally away from one another through the medium of suitably provided springs 85.

For drawing the members 71 inwardly toward one another and into engagement with the sides of the animal there are provided cables 86 which at one end are suitably secured to the frames of the members 71 and at their free ends are trained over double pulleys 87 supported between the ends of upper and lower bars 88, 88'. Bar 88 extends between front and rear bars 89 that are secured to the corner member 6 and at one end project laterally of the device as suggested in Figure 3. Bar 88' extends between and is supported by front bar 33 and rear bar 23.

At the ends thereof trained over the pulleys 87 the cables 86 are connected together in pairs as at 90.

For each pair of cables 86 there is provided a pull cable 91.

As best shown in Figure 6 the cables 91 at one end are trained over double pulleys 92 suitably mounted between intermediate portion of the bars 88, 88' and respectively connected with the pairs of cables 86 as at 93.

The cables 91 extend laterally toward one side of the device where they are trained over a pulley 94 mounted on a bracket secured to a bar 95 that connects the free ends of the aforementioned bars 89.

At the last mentioned ends thereof, the cables 91 are connected together and to a strap 96 that is in turn secured to a lever 97.

Lever 97 is pivoted at one end as at 98 to a bar 99 that extends between the aforementioned bar 95 and a bar 100 that connects one end of the front and rear bars 50, 101. (See Figures 10, 2 and 1.)

The bar 99 parallels a vertical bar 99a that extends between the bars 95 and 100. Between bars 99 and 99a is a diagonal bar 102 that is provided with a series of relatively spaced bolts 103 on which are confined between the bar 102 and individual washers 104 sleeves 105.

Thus it will be seen that to draw the members 71 inwardly toward one another into engagement with the sides of the animal a downward pull is exerted on the lever 97. This will result in the members 71 being drawn inwardly toward one another against the action of springs 85, and the members 71 are then secured in proper pressure contact with the body of the animal by engaging the lever 97 under one of the sleeve covered bolts 103 as will be clear from a study of Figure 10.

The utility and advantages of the invention will be apparent from the following:—

As previously stated the animal enters the device through the rear thereof, the operator causing the doors 18 to be swung to an open position by pulling on the pull cord 28. As the animal passes into the device and moves across the narrow floor board 16 the head of the animal is passed through the opening 36 provided in the front doors 29. In this connection it will be understood that normally the rod 62 under action of spring 67 will be in a substantially vertical position engaging a stop 106 suitably provided therefor on one of the doors 29.

With the head of the animal thrust through the opening 36 bar 62 is swung downwardly against the action of spring 67 across the back of the neck of the animal and engaged with a proper notch 70 in the bar 69 to secure the head of the animal against being drawn back inwardly through the opening 36. Next, the chain 56 with one end thereof properly engaged with the hook 57 has the sheathed portion 61 thereof passed over the top of the nose of the animal to press the nose into engagement with the rests 54. One end of the lever 60 is then engaged with a bracket 53 and pressure, by the operator, is maintained on the lever 60 to hold the nose of the animal engaged with the rests 54.

The animal is next restrained against side movement or sway by pulling on the lever 97 which will cause the members 71 against the action of springs 85 to move inwardly into pressure contact with the sides of the body of the animal. In this connection it will be noted that the plates 73 of the members 71 clear the floor board 16 as clearly shown in Figure 4 so as to permit these plates to come in contact with the legs of the animal forcing the legs of the animal inwardly and precluding the animal from stepping off of the platform or floor board 16 at either side of the latter. Thus the animal is held in a fully restrained condition so that a dehorning operation, branding operation or other analagous operation may be performed on the animal quickly and expeditiously and without danger to any of the attendants.

After the desired operation has been performed lever 97 is released permitting the side members 71 to spread apart. Lever 62 is also released to swing back to an out of the way position under action of spring 67 while lever 60 is likewise released to permit the animal to move its nose from off the rest 54. To permit the animal to pass from the device the operator next, by pulling on the string 48 unlatches the doors 29 and then by pulling downwardly on the lever 43 causes the doors 29 to swing apart to permit the animal to pass out of the restraining device.

Also the frame structure includes a vertical bar 49a that extends between one end of upper rear cross-bar 23 and lower rear cross-bar 101; bars 49, 49a, respectively, extending upwardly beyond the respective cross-bars 33 and 23 and at the upper ends thereof being riveted to the free ends of bars 89. Also included in the frame structure is an upper side bar 95' that extends between and connects bars 23 and 33; and a lower bar 95a that extends between and connects bars 50 and 101 as best shown in Figures 1, 2 and 4.

It is thought that a clear understanding of the construction, utility and advantages of an invention of this character will be had without a more detailed description.

Having thus described the invention, what is claimed is:—

1. A restraining device for livestock comprising a skeleton frame structure, a relatively narrow flooring member mounted in said structure and extending from the front to the rear thereof, a pair of door members pivotally suspended from the top of the frame structure at the rear of the latter and movable inwardly towards one another to a closed position substantially in alignment with said floor member, a pair of doors pivotally suspended from the top of said frame structure at the front of the latter and movable inwardly towards one another to a closed position in substantial alignment with said floor member, said last mentioned doors being formed intermediate their ends to provide an opening to receive the head of an animal within the restraining device, cooperating means on the last mentioned door members engageable with the head of an animal to prevent withdrawal of the head of the animal inwardly of the device through said opening, body "squeeze" members pivoted within said frame structure at opposite sides of said flooring for movement inwardly towards one another into pressure engagement with the sides of the animal, and means for moving said "squeeze" members inwardly into engagement with the body of the animal and for securing said members in the desired pressure-contact with the body of the animal to restrain the animal against lateral shifting movement.

2. A restraining device for livestock comprising a skeleton frame structure, are relatively narrow flooring member mounted in said structure and extending from the front to the rear thereof, a pair of door members pivotally suspended from the top of the frame structure at the rear of the latter and movable inwardly towards one another to a closed position substantially in alignment with said floor member, a pair of doors pivotally suspended from the top of said frame structure at the front of the latter and movable inwardly towards one another to a closed position in substantial alignment with said floor member, said last mentioned doors being formed intermediate their ends to provide an opening to receive the head of an animal within the restraining device, cooperating means on the last mentioned door members engageable with the head of an animal to prevent withdrawal of the head of the animal inwardly of the device through said opening, body "squeeze" members pivoted within said frame structure at opposite sides of said flooring for movement inwardly towards one another into pressure engagement with the sides of the animal, and means for moving said "squeeze" members inwardly into engagement with the body of the animal and for securing said members in the desired pressure contact with the body of the animal to restrain the animal against lateral shifting movement, said last mentioned doors being also provided with complemental rests projecting forwardly therefrom to accommodate the nose of the animal, and a restraining device associated with said rests for releasably securing the nose of the animal in position on said rests.

3. An animal restraining device as set out in claim 1 and wherein each of said "squeeze" members comprises a frame, a pair of spaced bars supported in the frame between opposed members of the frame, and a plurality of chain members extending between said bars.

4. An animal restraining device as set out in claim 1 and wherein each of said "squeeze" members comprises a frame, upper and lower bars supported in the frame between opposed members of the frame, a plurality of chain members extending between said bars, means adjustably connecting one end of the chains with the lower one of said bars, said chains having free ends provided with rings, and hooks pivotally mounted on the upper one of said bars and engaging said rings for connecting the free ends of the chains with the upper one of said bars.

5. In an animal restraining device of the character described, a pair of pendant swingable members having intermediate portions provided to present therebetween an opening to receive the head and neck of an animal, a lever adapted to extend across said opening and over the neck of the animal to retain the head of the animal against withdrawal through said opening, said lever being pivoted adjacent one end to one of said pendant members, a bar secured to the other of said pendant members and provided with a longitudinal series of notches, and said lever having a free end adapted to be engaged with a selected one of the notches for releasably retaining the bar in engagement across the neck of the animal, and a spring device connected with the lever adjacent the pivoted end of the latter for normally urging the lever to swing upwardly in a counterclockwise direction; and coacting latch means on said pendant swingable members for releasably securing said members in substantial parallelism one with the other and against relative swinging movement.

6. In a restraining device of the character described, a pair of pendant members swingable in a vertical plane toward and away from one another, said members being formed to provide an opening for receiving the head and neck of an animal, latch means associated with said members for securing the members releasably against separation, brackets projecting forwardly from said members, rests on said brackets to accommodate the nose of the animal, one of said brackets having a member projecting therefrom, a chain engageable with said projecting member at a selected point in the length of said chain, and a handle operatively connected to one end of said chain, said handle adapted to have one end thereof brought into bearing engagement with the other of said brackets whereby, upon a downward swinging movement of said handle, said chain may be drawn taut across the nose of the animal on said rests.

JOHN C. YOKUM.